United States Patent
Liss et al.

(10) Patent No.: US 12,117,948 B2
(45) Date of Patent: Oct. 15, 2024

(54) DATA PROCESSING UNIT WITH TRANSPARENT ROOT COMPLEX

(71) Applicant: Mellanox Technologies, Ltd., Yokneam (IL)

(72) Inventors: Liran Liss, Atzmon (IL); Rabia Loulou, Nazareth (IL); Idan Burstein, Akko (IL); Tzuriel Katoa, Tiberias (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 52 days.

(21) Appl. No.: 17/976,909

(22) Filed: Oct. 31, 2022

(65) Prior Publication Data

US 2024/0143526 A1   May 2, 2024

(51) Int. Cl.
*G06F 13/28* (2006.01)
*G06F 13/42* (2006.01)

(52) U.S. Cl.
CPC .......... *G06F 13/28* (2013.01); *G06F 13/4221* (2013.01)

(58) Field of Classification Search
CPC .............................. G06F 13/28; G06F 13/4221
See application file for complete search history.

(56) References Cited

U.S. PATENT DOCUMENTS

| | | | |
|---|---|---|---|
| 5,003,465 A | 3/1991 | Chisholm et al. | |
| 5,463,772 A | 10/1995 | Thompson et al. | |
| 5,615,404 A | 3/1997 | Knoll et al. | |
| 5,768,612 A | 6/1998 | Nelson | |
| 5,864,876 A | 1/1999 | Rossum et al. | |
| 5,893,166 A | 4/1999 | Frank et al. | |
| 5,954,802 A | 9/1999 | Griffith | |
| 6,070,219 A | 5/2000 | McAlpine et al. | |
| 6,226,680 B1 | 5/2001 | Boucher et al. | |
| 6,321,276 B1 | 11/2001 | Forin | |
| 6,581,130 B1 | 6/2003 | Brinkmann et al. | |
| 6,701,405 B1 | 3/2004 | Adusumilli et al. | |

(Continued)

FOREIGN PATENT DOCUMENTS

| | | |
|---|---|---|
| EP | 1657878 A1 | 5/2006 |
| EP | 2463782 A2 | 6/2012 |
| WO | 2010062679 A2 | 6/2010 |

OTHER PUBLICATIONS

"Switchtec PAX Gen 4 Advanced Fabric PCIe Switch Family—PM42100, PM42068, PM42052, PM42036, PM42028," Product Brochure, Microchip Technology Incorporated, pp. 1-2, year 2021.

(Continued)

*Primary Examiner* — Henry Tsai
*Assistant Examiner* — Christopher A Daley
(74) *Attorney, Agent, or Firm* — MEITAR PATENTS LTD.

(57) ABSTRACT

Computing apparatus includes a central processing unit (CPU) and a root complex connected to the CPU and to a first peripheral component bus, which has at least a first downstream port for connection to at least one peripheral device. Switching logic has an upstream port for connection to a second downstream port on a second peripheral component bus of a host computer, and is connected to the root complex so that when a peripheral device is connected to the first downstream port on the first peripheral component bus, the switching logic presents the peripheral device to the host computer in an address space of the second peripheral component bus.

18 Claims, 3 Drawing Sheets

(56) References Cited

U.S. PATENT DOCUMENTS

| | | | |
|---|---|---|---|
| 6,766,467 B1 | 7/2004 | Neal et al. | |
| 6,789,143 B2 | 9/2004 | Craddock et al. | |
| 6,901,496 B1 | 5/2005 | Mukund et al. | |
| 6,981,027 B1 | 12/2005 | Gallo et al. | |
| 7,171,484 B1 | 1/2007 | Krause et al. | |
| 7,225,277 B2 | 5/2007 | Johns et al. | |
| 7,263,103 B2 | 8/2007 | Kagan et al. | |
| 7,299,266 B2 | 11/2007 | Boyd et al. | |
| 7,395,364 B2 | 7/2008 | Higuchi et al. | |
| 7,464,198 B2 | 12/2008 | Martinez et al. | |
| 7,475,398 B2 | 1/2009 | Nunoe | |
| 7,502,884 B1* | 3/2009 | Shah | G06F 13/12 710/316 |
| 7,548,999 B2 | 6/2009 | Haertel et al. | |
| 7,577,773 B1 | 8/2009 | Gandhi et al. | |
| 7,657,659 B1 | 2/2010 | Lambeth et al. | |
| 7,720,064 B1 | 5/2010 | Rohde | |
| 7,752,417 B2 | 7/2010 | Manczak et al. | |
| 7,809,923 B2 | 10/2010 | Hummel et al. | |
| 7,921,178 B2 | 4/2011 | Haviv | |
| 7,921,237 B1 | 4/2011 | Holland et al. | |
| 7,945,752 B1 | 5/2011 | Miller et al. | |
| 8,001,592 B2 | 8/2011 | Hatakeyama | |
| 8,006,297 B2 | 8/2011 | Johnson et al. | |
| 8,010,763 B2 | 8/2011 | Armstrong et al. | |
| 8,051,212 B2 | 11/2011 | Kagan et al. | |
| 8,103,785 B2 | 1/2012 | Crowley et al. | |
| 8,255,475 B2 | 8/2012 | Kagan et al. | |
| 8,260,980 B2 | 9/2012 | Weber et al. | |
| 8,346,919 B1 | 1/2013 | Eiriksson et al. | |
| 8,447,904 B2 | 5/2013 | Riddoch | |
| 8,504,780 B2 | 8/2013 | Mine et al. | |
| 8,645,663 B2 | 2/2014 | Kagan et al. | |
| 8,745,276 B2 | 6/2014 | Bloch et al. | |
| 8,751,701 B2 | 6/2014 | Shahar et al. | |
| 8,824,492 B2 | 9/2014 | Wang et al. | |
| 8,892,804 B2* | 11/2014 | Morein | G06F 13/4027 345/506 |
| 8,949,486 B1 | 2/2015 | Kagan et al. | |
| 9,038,073 B2 | 5/2015 | Kohlenz et al. | |
| 9,092,426 B1 | 7/2015 | Bathija et al. | |
| 9,298,723 B1 | 3/2016 | Vincent | |
| 9,331,963 B2* | 5/2016 | Krishnamurthi | G06F 3/0664 |
| 9,483,290 B1* | 11/2016 | Mantri | G06F 9/45558 |
| 9,678,818 B2 | 6/2017 | Raikin et al. | |
| 9,696,942 B2 | 7/2017 | Kagan et al. | |
| 9,727,503 B2 | 8/2017 | Kagan et al. | |
| 9,830,082 B1 | 11/2017 | Srinivasan et al. | |
| 9,904,568 B2 | 2/2018 | Vincent et al. | |
| 10,078,613 B1 | 9/2018 | Ramey | |
| 10,120,832 B2 | 11/2018 | Raindel et al. | |
| 10,135,739 B2 | 11/2018 | Raindel et al. | |
| 10,152,441 B2 | 12/2018 | Liss et al. | |
| 10,162,793 B1 | 12/2018 | Bshara et al. | |
| 10,210,125 B2 | 2/2019 | Burstein | |
| 10,218,645 B2 | 2/2019 | Raindel et al. | |
| 10,423,774 B1 | 4/2019 | Zelenov et al. | |
| 10,382,350 B2 | 8/2019 | Bohrer et al. | |
| 10,417,156 B2* | 9/2019 | Hsu | G06F 13/4022 |
| 10,628,622 B1 | 4/2020 | Sivaraman et al. | |
| 10,657,077 B2 | 5/2020 | Ganor et al. | |
| 10,671,309 B1 | 6/2020 | Glynn | |
| 10,684,973 B2 | 6/2020 | Connor et al. | |
| 10,715,451 B2 | 7/2020 | Raindel et al. | |
| 10,824,469 B2 | 11/2020 | Hirshberg et al. | |
| 10,841,243 B2 | 11/2020 | Levi et al. | |
| 10,999,364 B1 | 5/2021 | Itigin et al. | |
| 11,003,607 B2 | 5/2021 | Ganor et al. | |
| 11,080,225 B2* | 8/2021 | Borikar | G06F 13/28 |
| 11,086,713 B1 | 8/2021 | Sapuntzakis et al. | |
| 11,126,575 B1 | 9/2021 | Aslanidis et al. | |
| 11,537,548 B2* | 12/2022 | Makhija | H04L 49/70 |
| 11,550,745 B1* | 1/2023 | Kelm | G06F 13/24 |
| 2002/0152327 A1 | 10/2002 | Kagan et al. | |
| 2003/0023846 A1 | 1/2003 | Krishna et al. | |
| 2003/0046530 A1 | 3/2003 | Poznanovic | |
| 2003/0120836 A1 | 6/2003 | Gordon | |
| 2004/0010612 A1 | 1/2004 | Pandya | |
| 2004/0039940 A1 | 2/2004 | Cox et al. | |
| 2004/0057434 A1 | 3/2004 | Poon et al. | |
| 2004/0158710 A1 | 8/2004 | Buer et al. | |
| 2004/0221128 A1 | 11/2004 | Beecroft et al. | |
| 2004/0230979 A1 | 11/2004 | Beecroft et al. | |
| 2005/0102497 A1 | 5/2005 | Buer | |
| 2005/0198412 A1 | 9/2005 | Pedersen et al. | |
| 2005/0216552 A1 | 9/2005 | Fineberg et al. | |
| 2006/0095754 A1 | 5/2006 | Hyder et al. | |
| 2006/0104308 A1 | 5/2006 | Pinkerton et al. | |
| 2006/0259291 A1 | 11/2006 | Dunham et al. | |
| 2006/0259661 A1 | 11/2006 | Feng et al. | |
| 2007/0011429 A1 | 1/2007 | Sangili et al. | |
| 2007/0061492 A1 | 3/2007 | Van Riel | |
| 2007/0223472 A1 | 9/2007 | Tachibana et al. | |
| 2007/0226450 A1 | 9/2007 | Engbersen et al. | |
| 2007/0283124 A1 | 12/2007 | Menczak et al. | |
| 2007/0297453 A1 | 12/2007 | Niinomi | |
| 2008/0005387 A1 | 1/2008 | Mutaguchi | |
| 2008/0092148 A1* | 4/2008 | Moertl | G06F 12/1009 719/321 |
| 2008/0147822 A1 | 6/2008 | Benhase et al. | |
| 2008/0147904 A1 | 6/2008 | Freimuth et al. | |
| 2008/0168479 A1 | 7/2008 | Purtell et al. | |
| 2008/0313364 A1 | 12/2008 | Flynn et al. | |
| 2009/0086736 A1 | 4/2009 | Foong et al. | |
| 2009/0106771 A1 | 4/2009 | Benner et al. | |
| 2009/0204650 A1 | 8/2009 | Wong et al. | |
| 2009/0319775 A1 | 12/2009 | Buer et al. | |
| 2009/0328170 A1 | 12/2009 | Williams et al. | |
| 2010/0030975 A1 | 2/2010 | Murray et al. | |
| 2010/0095053 A1 | 4/2010 | Bruce et al. | |
| 2010/0095085 A1 | 4/2010 | Hummel et al. | |
| 2010/0211834 A1 | 8/2010 | Asnaashari et al. | |
| 2010/0217916 A1 | 8/2010 | Gao et al. | |
| 2010/0228962 A1 | 9/2010 | Simon et al. | |
| 2010/0322265 A1 | 12/2010 | Gopinath et al. | |
| 2011/0023027 A1 | 1/2011 | Kegel et al. | |
| 2011/0119673 A1 | 5/2011 | Bloch et al. | |
| 2011/0213854 A1 | 9/2011 | Haviv | |
| 2011/0246597 A1 | 10/2011 | Swanson et al. | |
| 2012/0314709 A1 | 12/2012 | Post et al. | |
| 2013/0067193 A1 | 3/2013 | Kagan et al. | |
| 2013/0080651 A1 | 3/2013 | Pope et al. | |
| 2013/0103777 A1 | 4/2013 | Kagan et al. | |
| 2013/0125125 A1 | 5/2013 | Karino et al. | |
| 2013/0142205 A1 | 6/2013 | Munoz | |
| 2013/0145035 A1 | 6/2013 | Pope et al. | |
| 2013/0159568 A1 | 6/2013 | Shahar et al. | |
| 2013/0263247 A1 | 10/2013 | Jungck et al. | |
| 2013/0276133 A1 | 10/2013 | Hodges et al. | |
| 2013/0311746 A1 | 11/2013 | Raindel et al. | |
| 2013/0325998 A1 | 12/2013 | Hormuth et al. | |
| 2013/0329557 A1 | 12/2013 | Petry | |
| 2013/0347110 A1 | 12/2013 | Dalal | |
| 2014/0089450 A1 | 3/2014 | Raindel et al. | |
| 2014/0089451 A1 | 3/2014 | Eran et al. | |
| 2014/0089631 A1 | 3/2014 | King | |
| 2014/0095753 A1* | 4/2014 | Crupnicoff | G06F 13/4022 710/308 |
| 2014/0122828 A1 | 5/2014 | Kagan et al. | |
| 2014/0129741 A1 | 5/2014 | Shahar et al. | |
| 2014/0156894 A1 | 6/2014 | Tsirkin et al. | |
| 2014/0181365 A1 | 6/2014 | Fanning et al. | |
| 2014/0185616 A1 | 7/2014 | Bloch et al. | |
| 2014/0244965 A1* | 8/2014 | Manula | G06F 12/1081 711/206 |
| 2014/0254593 A1 | 9/2014 | Mital et al. | |
| 2014/0282050 A1 | 9/2014 | Quinn et al. | |
| 2014/0282561 A1 | 9/2014 | Holt et al. | |
| 2015/0006663 A1 | 1/2015 | Huang | |
| 2015/0012735 A1 | 1/2015 | Tamir et al. | |
| 2015/0032835 A1 | 1/2015 | Sharp et al. | |
| 2015/0081947 A1 | 3/2015 | Vucinic et al. | |
| 2015/0100962 A1 | 4/2015 | Morita et al. | |
| 2015/0288624 A1 | 10/2015 | Raindel et al. | |

(56) References Cited

U.S. PATENT DOCUMENTS

| | | | |
|---|---|---|---|
| 2015/0319243 A1 | 11/2015 | Hussain et al. | |
| 2015/0347185 A1 | 12/2015 | Holt et al. | |
| 2015/0355938 A1 | 12/2015 | Jokinen et al. | |
| 2016/0065659 A1 | 3/2016 | Bloch et al. | |
| 2016/0085718 A1 | 3/2016 | Huang | |
| 2016/0132329 A1 | 5/2016 | Gupte et al. | |
| 2016/0154673 A1 | 6/2016 | Morris | |
| 2016/0226822 A1 | 8/2016 | Zhang et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0017609 A1* | 1/2017 | Menachem | G06F 13/4022 |
| 2017/0031810 A1* | 2/2017 | Bonzini | G06F 12/023 |
| 2017/0075855 A1 | 3/2017 | Sajeepa et al. | |
| 2017/0104828 A1 | 4/2017 | Brown et al. | |
| 2017/0180273 A1 | 6/2017 | Daly et al. | |
| 2017/0187629 A1 | 6/2017 | Shalev et al. | |
| 2017/0237672 A1 | 8/2017 | Dalal | |
| 2017/0264622 A1 | 9/2017 | Cooper et al. | |
| 2017/0286157 A1 | 10/2017 | Hasting et al. | |
| 2017/0371835 A1 | 12/2017 | Ranadive et al. | |
| 2018/0004954 A1 | 1/2018 | Liguori et al. | |
| 2018/0067893 A1 | 3/2018 | Raindel et al. | |
| 2018/0109471 A1 | 4/2018 | Chang et al. | |
| 2018/0114013 A1 | 4/2018 | Sood et al. | |
| 2018/0167364 A1 | 6/2018 | Dong et al. | |
| 2018/0210751 A1 | 7/2018 | Pepus et al. | |
| 2018/0219770 A1 | 8/2018 | Wu et al. | |
| 2018/0219772 A1 | 8/2018 | Koster et al. | |
| 2018/0246768 A1 | 8/2018 | Palermo et al. | |
| 2018/0262468 A1 | 9/2018 | Kumar et al. | |
| 2018/0285288 A1 | 10/2018 | Bemat et al. | |
| 2018/0329828 A1 | 11/2018 | Apfelbaum et al. | |
| 2019/0012350 A1 | 1/2019 | Sindhu et al. | |
| 2019/0026157 A1 | 1/2019 | Suzuki et al. | |
| 2019/0116521 A1 | 4/2019 | Pismenny et al. | |
| 2019/0124113 A1 | 4/2019 | Labana et al. | |
| 2019/0163364 A1 | 5/2019 | Gibb et al. | |
| 2019/0173846 A1 | 6/2019 | Patterson et al. | |
| 2019/0190892 A1 | 6/2019 | Menachem et al. | |
| 2019/0199690 A1 | 6/2019 | Klein | |
| 2019/0243781 A1 | 8/2019 | Thyamagondlu et al. | |
| 2019/0250938 A1 | 8/2019 | Claes et al. | |
| 2020/0012604 A1 | 1/2020 | Agarwal | |
| 2020/0026656 A1 | 1/2020 | Liao et al. | |
| 2020/0065269 A1 | 2/2020 | Balasubramani et al. | |
| 2020/0259803 A1 | 8/2020 | Menachem et al. | |
| 2020/0314181 A1 | 10/2020 | Eran et al. | |
| 2020/0401440 A1 | 12/2020 | Sankaran et al. | |
| 2021/0042255 A1* | 2/2021 | Colenbrander | G06F 3/0659 |
| 2021/0111996 A1 | 4/2021 | Pismenny et al. | |
| 2021/0133140 A1* | 5/2021 | Jeansonne | G06F 1/266 |
| 2021/0203610 A1 | 7/2021 | Pismenny et al. | |
| 2021/0209052 A1 | 7/2021 | Chen et al. | |
| 2022/0075747 A1 | 3/2022 | Shuler et al. | |
| 2022/0092135 A1 | 3/2022 | Sidman | |
| 2022/0100687 A1 | 3/2022 | Sahin et al. | |
| 2022/0103629 A1 | 3/2022 | Cherian et al. | |
| 2022/0283964 A1 | 9/2022 | Burstein et al. | |
| 2022/0308764 A1 | 9/2022 | Pismenny et al. | |
| 2022/0309019 A1 | 9/2022 | Duer et al. | |
| 2022/0334989 A1 | 10/2022 | Bar-Llan et al. | |
| 2022/0391341 A1 | 12/2022 | Rosenbaum et al. | |
| 2023/0010150 A1 | 1/2023 | Ben-Ishay et al. | |

OTHER PUBLICATIONS

Regula, "Using Non-Transparent Bridging in PCI Express Systems," PLX Technology, Inc., pp. 1-31, Jun. 2004.

Marcovitch et al., U.S. Appl. No. 17/987,904, filed Nov. 16, 2022.

Marcovitch, U.S. Appl. No. 17/707,555, filed Mar. 29, 2022.

Marcovitch et al., U.S. Appl. No. 17/979,013, filed Nov. 2, 2022.

Mellanox Technologies, "Understanding On Demand Paging (ODP)," Knowledge Article, pp. 1-6, Feb. 20, 2019 downloaded from https://community.mellanox.com/s/article/understanding-on-demand-paging--odp-x.

U.S. Appl. No. 17/372,466 Office Action dated Feb. 15, 2023.

U.S. Appl. No. 17/527,197 Office Action dated Sep. 28, 2023.

U.S. Appl. No. 17/211,928 Office Action dated May 25, 2023.

U.S. Appl. No. 17/979,013 Office Action dated Jan. 29, 2024.

U.S. Appl. No. 17/987,904 Office Action dated Apr. 11, 2024.

Shirey, "Internet Security Glossary, Version 2", Request for Comments 4949, pp. 1-365, Aug. 2007.

Information Sciences Institute, "Transmission Control Protocol; DARPA Internet Program Protocol Specification", Request for Comments 793, pp. 1-90, Sep. 1981.

InfiniBand TM Architecture Specification vol. 1, Release 1.3, pp. 1-1842, Mar. 3, 2015.

Stevens., "TCP Slow Start, Congestion Avoidance, Fast Retransmit, and Fast Recovery Algorithms", Request for Comments 2001, pp. 1-6, Jan. 1997.

Netronome Systems, Inc., "Open vSwitch Offload and Acceleration with Agilio® CX SmartNICs", White Paper, pp. 1-7, Mar. 2017.

PCI Express® Base Specification , Revision 3.0, pp. 1-860, Nov. 10, 2010.

Dierks et al., "The Transport Layer Security (TLS) Protocol Version 1.2", Request for Comments: 5246 , pp. 1-104, Aug. 2008.

Turner et al., "Prohibiting Secure Sockets Layer (SSL) Version 2.0", Request for Comments: 6176, pp. 1-4, Mar. 2011.

Rescorla et al., "The Transport Layer Security (TLS) Protocol Version 1.3", Request for Comments: 8446, pp. 1-160, Aug. 2018.

Comer., "Packet Classification: A Faster, More General Alternative to Demultiplexing", The Internet Protocol Journal, vol. 15, No. 4, pp. 12-22, Dec. 2012.

Salowey et al., "AES Galois Counter Mode (GCM) Cipher Suites for TLS", Request for Comments: 5288, pp. 1-8, Aug. 2008.

Burstein, "Enabling Remote Persistent Memory", SNIA-PM Summit, pp. 1-24, Jan. 24, 2019.

Chung et al., "Serving DNNs in Real Time at Datacenter Scale with Project Brainwave", IEEE Micro Pre-Print, pp. 1-11, Mar. 22, 2018.

Talpey, "Remote Persistent Memory—With Nothing But Net", SNIA—Storage developer conference , pp. 1-30, year 2017.

Microsoft, "Project Brainwave", pp. 1-5, year 2019.

"NVM Express—Base Specifications," Revision 2.0, pp. 1-452, May 13, 2021.

Pismenny et al., "Autonomous NIC Offloads", submitted for evaluation of the 26th International Conference on Architectural Support for Programming Languages and Operating Systems (ASPLOS '21), p. 1-18, Dec. 13, 2020.

Lebeane et al., "Extended Task queuing: Active Messages for Heterogeneous Systems", Proceedings of the International Conference for High Performance Computing, Networking, Storage and Analysis (SC'16), pp. 933-944, Nov. 2016.

NVM Express Inc., "NVM Express over Fabrics," Revision 1.0, pp. 1-49, Jun. 5, 2016.

"Linux kernel enable the IOMMU—input/output memory management unit support", pp. 1-2, Oct. 15, 2007 downloaded from http://www.cyberciti.biz/tips/howto-turn-on-linux-software-iommu-support.html.

Hummel M., "IO Memory Management Hardware Goes Mainstream", AMD Fellow, Computation Products Group, Microsoft WinHEC, pp. 1-7, 2006.

NVM Express, Revision 1.0e, pp. 1-127, Jan. 23, 2013.

Infiniband Trade Association, "InfiniBandTM Architecture Specification", vol. 1, Release 1.2.1, pp. 1-1727, Nov. 2007.

Shah et al., "Direct Data Placement over Reliable Transports", IETF Network Working Group, RFC 5041, pp. 1-38, Oct. 2007.

Culley et al., "Marker PDU Aligned Framing for TCP Specification", IETF Network Working Group, RFC 5044, pp. 1-75, Oct. 2007.

"MPI: A Message-Passing Interface Standard", Version 2.2, Message Passing Interface Forum, pp. 1-64, Sep. 4, 2009.

Welsh et al., "Incorporating Memory Management into User-Level Network Interfaces", Department of Computer Science, Cornell University, Technical Report TR97-1620, pp. 1-10, Feb. 13, 1997.

(56) References Cited

OTHER PUBLICATIONS

Tsirkin et al., "Virtual I/O Device (VIRTIO) Version 1.1", Committee Specification Draft 01/Public Review Draft 01, Oasis Open, pp. 1-121, Dec. 20, 2018.

* cited by examiner

DATA PROCESSING UNIT WITH TRANSPARENT ROOT COMPLEX

FIELD OF THE INVENTION

The present invention relates generally to computing systems, and particularly to devices and methods for bridging memory address spaces among computing system components and peripheral devices.

BACKGROUND

PCI Express® (commonly referred to as PCIe) is a high-speed packet-based peripheral component bus standard, which is used in most current computer motherboards. The PCIe architecture is built around a "root complex," which connects the central processing unit (CPU) and memory subsystem of the computer to the PCIe interconnect fabric. The root complex has one or more downstream ports, which connect to the upstream ports of PCIe endpoints, switches, or bridges to other PCIe buses. Each PCIe switch has a number of downstream ports, which may likewise connect to upstream ports of other endpoints, switches, or bridges, thus forming a sub-hierarchy within the PCIe fabric.

SUMMARY

Embodiments of the present invention that are described hereinbelow provide improved apparatus and methods for interconnecting host processors and peripheral devices.

There is therefore provided, in accordance with an embodiment of the invention, computing apparatus, including a central processing unit (CPU) and a root complex connected to the CPU and to a first peripheral component bus, which has at least a first downstream port for connection to at least one peripheral device. Switching logic has an upstream port for connection to a second downstream port on a second peripheral component bus of a host computer, and is connected to the root complex so that when a peripheral device is connected to the first downstream port on the first peripheral component bus, the switching logic presents the peripheral device to the host computer in an address space of the second peripheral component bus.

In a disclosed embodiment, the switching logic includes a virtual switch. Additionally or alternatively, the peripheral device includes a data storage device and/or a network interface controller (NIC).

In some embodiments, the switching logic is to present the peripheral device as a physical function in the address space of the second peripheral component bus. In one embodiment, the peripheral device is to expose a virtual function on the first peripheral component bus, and the switching logic is to present the virtual function as the physical function in the address space of the second peripheral component bus.

Alternatively or additionally, the switching logic is to present the peripheral device as a virtual function in the address space of the second peripheral component bus.

In some embodiments, the address space of the second peripheral component bus is a second address space, and the root complex is to present the peripheral device to the CPU in a first address space of the first peripheral component bus. In a disclosed embodiment, the switching logic is to receive a bus transaction via the upstream port referencing the second address space of the second peripheral component bus and directed to the peripheral device, to translate the bus command to the first address space, and to transmit the translated bus command over the first peripheral component bus.

In one embodiment, the switching logic is to reserve a segment of the address space for a dummy device, to enable hot-plugging of a further peripheral device in the reserved segment.

There is also provided, in accordance with an embodiment of the invention, a method for computing, which includes providing a peripheral device server including a root complex connected to a first peripheral component bus. A peripheral device is connected to a first downstream port on the first peripheral component bus. An upstream port of the peripheral device server is connected to a second downstream port on a second peripheral component bus of a host computer. Using switching logic in the peripheral device server coupled between the upstream port and the first downstream port, the peripheral device is presented to the host computer in an address space of the second peripheral component bus.

The present invention will be more fully understood from the following detailed description of the embodiments thereof, taken together with the drawings in which:

DETAILED DESCRIPTION OF EMBODIMENTS

Overview

In conventional computer and software architectures, the host computer communicates with peripheral devices via its own, local peripheral component bus, such as a PCIe bus. For this purpose, the host computer includes a root complex, as explained above. The operating system of the host computer defines the peripheral device functions that are available via the bus and assigns each one an address range on the bus, known as a base address register (BAR) in PCIe parlance. Application software running on the host processor can then access the peripheral device functions by writing to and reading from the assigned address ranges. The PCIe bus also permits "hot plugging," in which devices can be connected to and disconnected from the bus while the computer is running.

In large computer networks, for example in a data center, multiple host computers commonly share the resources of a given peripheral device, such as a network interface controller (NIC), a graphics processing unit (GPU), or a storage device, such as a solid-state disk (SSD). These peripheral devices may be connected to a dedicated server, such as a storage server or "smart NIC," which distributes the peripheral device services among the host computers. A peripheral device server of this sort is referred to herein, for the sake of simplicity and clarity, as a "data processing unit" (DPU), regardless of the type or types of peripheral devices that are connected to it. The DPU may run software that emulates the functionality of a peripheral device that is attached locally to a host computer, while the peripheral device is accessed through and controlled by the DPU. This sort of software-based emulation is described, for example, in U.S. Patent Application Publication 2022/0309019, whose disclosure is incorporated herein by reference.

Embodiments of the present invention that are described herein offer an alternative solution, in which host computers are able to interact with a peripheral device on the peripheral component bus of the DPU using standard bus transactions. The interaction is transparent to the host computer, as though the peripheral device were connected directly to the peripheral component bus of the host computer rather than to the DPU. Translation of transaction parameters is carried out by switching logic in the DPU and does not require software-based emulation (although it can be integrated with emulation to offer additional device capabilities to the host computer).

In the disclosed embodiments, address ranges on the host peripheral component bus are allocated to selected functions of a peripheral device or devices attached to the DPU. When bus commands are issued by software running on the host computer to these address ranges on the host bus, the commands are "tunneled" transparently through the root complex of the DPU, with appropriate conversion of the bus addresses and identifiers, to destination devices on the peripheral component bus of the DPU. Responses from the devices are tunneled back to the peripheral component bus of the host computer in similar fashion. By appropriate reservation of address ranges on the peripheral component bus of the host computer, it is also possible to enable the host computer to access devices that have been hot-plugged into the peripheral component bus of the host computer.

The embodiments that are described hereinbelow provide computing apparatus, such as a DPU, which comprises a central processing unit (CPU) and a root complex. The root complex is connected both to the CPU and to a peripheral component bus of the DPU, which has downstream ports for connection to peripheral devices. In addition, the DPU comprises switching logic, which is connected to the CPU and root complex of the DPU and has one or more upstream ports for connection to downstream ports on the peripheral component buses of one or more host computers (and is thus also in communication with the root complex of the host computer). When a peripheral device is connected to a downstream port on the peripheral component bus of the DPU, the switching logic can be configured to present the peripheral device to the host computer in the address space of the peripheral component bus of the host computer.

The switching logic typically comprises a virtual switch, which may be programmed in software to expose either physical functions or virtual functions, or both, of the peripheral devices on the bus of the DPU to the host computer. The switching logic may have multiple upstream ports, for connection to downstream ports on the peripheral component buses of multiple host computers, and may be programmed to assign different functions of the same peripheral device to different host computers. Each function has its own address range (BAR), which is translated by the switching logic to a corresponding address range on the peripheral component bus of the host computer to which it has been assigned.

System Description

Figure 1:
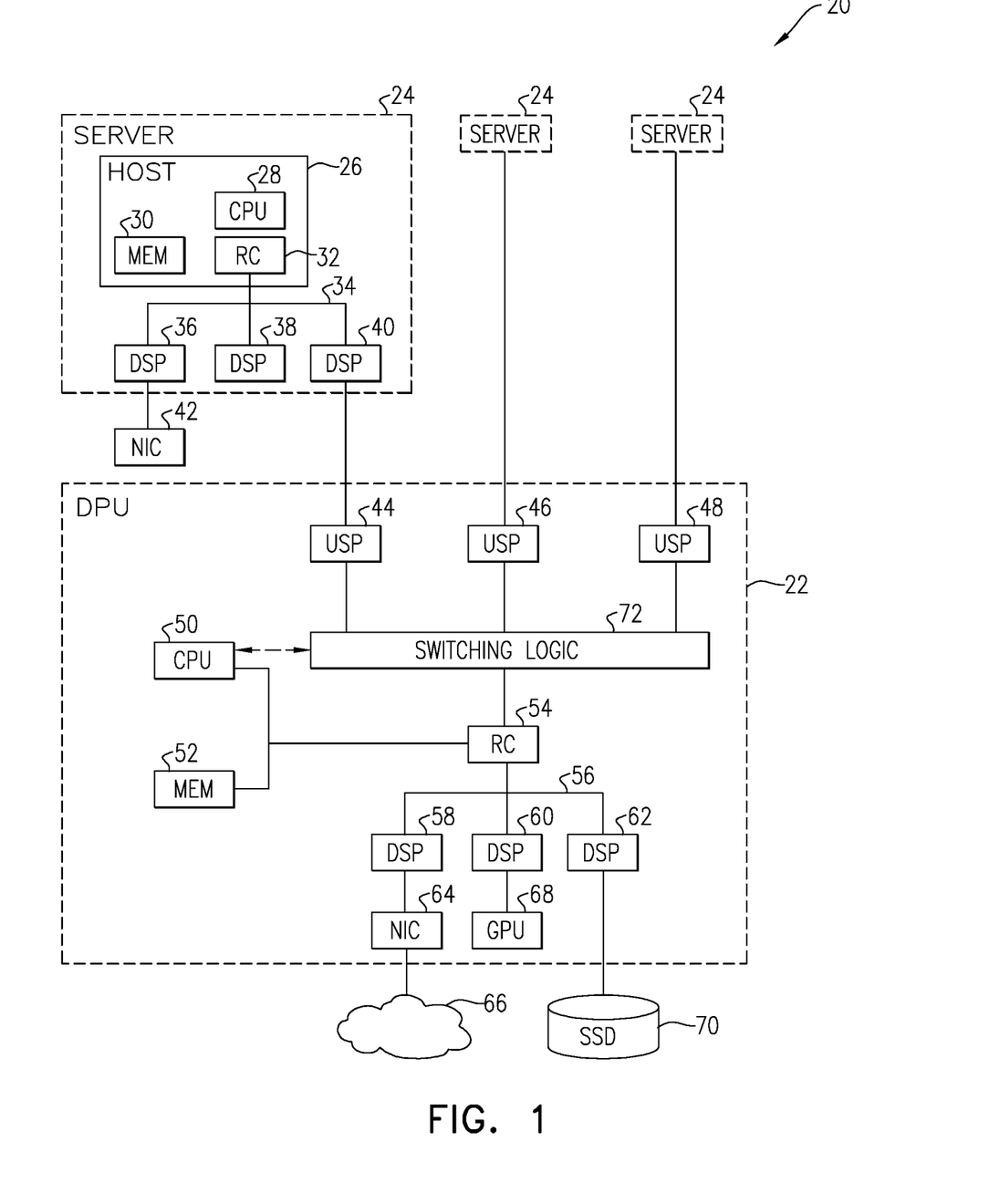
FIG. 1 is a block diagram that schematically illustrates a computer system, in accordance with an embodiment of the invention.

FIG. 1 is a block diagram that schematically illustrates a computer system 20, in accordance with an embodiment of the invention. System 20 comprises a DPU 22, which supports transparent tunneling of root complex functionality for one or more servers 24.

Each server 24 comprises a host computer 26, which includes a CPU 28 and a memory 30. A root complex (RC) 32 in host computer 26 connects to a local peripheral component bus, such as a PCIe bus 34, having multiple downstream ports (DSPs) 36, 38, 40. In the pictured example, DSP 36 connects directly to a local peripheral device, such as a NIC 42 that serves server 24. DSP 40, on the other hand, connects to an upstream port (USP) 44 of DPU 22. Other USPs 46, 48 of DPU 22 connect to downstream ports on other servers 24.

DPU 22 comprises a CPU 50 and a memory 52, along with its own root complex (RC) 54, which connects to a PCIe bus 56 of DPU 22. PCIe bus 56 comprises multiple DSPs 58, 60, 62 for physical connection to respective endpoints. In the pictured example, DSP 58 connects to a NIC 64, which is connected to a packet network 66; DSP 60 connects to a GPU 68; and DSP 62 connects to an SSD 70. RC 54 presents the devices on PCIe bus 56 to CPU 50 in the native address space of the PCIe bus, thus enabling CPU 50 to access the peripheral devices directly. CPU 50 may perform device emulation functions on behalf of servers 24, such as the functions described in the above-mentioned U.S. Patent Application Publication 2022/0309019, but these functions are beyond the scope of the present description.

Switching logic 72 in DPU 22 connects to USPs 44, 46, 48 and to RC 54, so as to enable servers 24 to access the functions of the peripheral devices on PCIe bus 56, such as NIC 64, GPU 68, and/or SSD 70. For this purpose, switching logic 72 functions as a virtual switch, which is configured in software by CPU 50. In this respect, switching logic 72 appears to host computer 26 to be a PCIe switch, having USP 44 connected to DSP 40 and virtual downstream ports exposing the physical and/or virtual functions of one or more of the actual, physical endpoints on PCIe bus 56.

Switching logic 72 tunnels bus transactions received through USP 44 to bus 56, and similarly tunnels bus transactions from bus 56 through to USP 44. This tunneling functionality is carried out in real time by the switching logic, using tables to translate the bus addresses and the Bus Device Function (BDF) indicators between PCIe bus 34 of host computer 26 and PCIe bus 56 of DPU 22. The tables can be programmed individually for each peripheral device function that is exposed by DPU 22 to servers 24. Details of these tables are described hereinbelow.

Although PCIe buses 34 and 56 in FIG. 1 have simple, flat topologies for the sake of simplicity, the principles of the present embodiments may similarly be applied to buses comprising multiple levels of switches and endpoints. Furthermore, although the present embodiments relate, for the sake of clarity, specifically to PCIe buses, the principles of the present invention are similarly applicable, mutatis mutandis, to peripheral component buses of other types. All such alternative embodiments and configurations are considered to be within the scope of the present invention.

Tunneling Configurations

When a peripheral device is physically connected to a PCIe bus, it exposes at least one physical function (PF) and may expose one or more virtual functions (VFs). The PF enables a host computer to control a wider range of capabilities of the peripheral device, such as single root input/output virtualization (SR-IOV) and power management, while the VFs provide access to only a narrower range of functionalities. In embodiments of the present invention, switching logic 72 can expose the PF and VFs to host computer 26 in different combinations, as illustrated in the figures that follow.

The functions of each peripheral device on bus 56 of DPU 22 are exposed to root complex 54 during the host enumeration phase of the bootup of DPU 22. (Each such peripheral device is referred to as an endpoint, or EP.) Software running on CPU 50 builds the configuration space of bus 56, including assigning a local BDF and BAR to each of the functions of each of the endpoints on bus 56. For some purposes, such as implementation of SR-IOV, the addresses of the VFs of a given endpoint may be separated by a specified, fixed stride. The configuration space also defines the capabilities of each function and indicates to switching logic 72 which functions and capabilities are available for tunneled use by servers 24 via USP 44, 46 or 48. Different functions of the same endpoint on bus 56 may be exposed to different servers 24 via the respective USPs, so that the servers can share the functions of a given peripheral device.

Host computer 26 on server 24 carries out its own host enumeration process and thus builds the configuration space of its own bus 34. As a part of this process, functions exposed by switching logic 72 through the corresponding USP 44, 46 or 48 are also enumerated, and host computer 26 assigns a BAR to each function. Switching logic 72 may also expose a dummy function to host computer 26, which causes the host computer to reserve a BAR for the dummy function. This reserved BAR can later be used to make space to access hot-plugged devices on bus 34 of server 24, by "unplugging" the dummy device.

In the configuration space of bus 34, the capabilities of the tunneled functions may be identical to those of the corresponding functions on bus 56, or they may be different. For example, as illustrated in the examples described below, the PF of a given EP may or may not be tunneled together with the VFs. As another example, a given VF on bus 56 may be exposed on bus 34 as though it were a PF. When the PF is tunneled to bus 34, certain capabilities of the PF, for example power management, may be masked so that host computer 26 is unable to interact with these capabilities. Additionally or alternatively, the VFs of a given endpoint may offer capabilities that the actual, peripheral device does not offer but rather are emulated by software running on DPU 22. For example, an SSD that is physically configured to support a given storage protocol may receive and return data from and to host computer 26 by emulation of a different storage protocol.

After the tunneled version of a given function (PF or VF) on bus 56 has been enumerated and configured in RC 32 of bus 34, CPU 50 issues an "Engage Device" command to instruct switching logic 72 to begin tunneling transactions between host computer 26 and the corresponding EP on bus 56. As part of this process, CPU 50 builds translation tables in the memory of switching logic 72 to enable the switching logic to translate bus commands and responses on the fly between the address spaces of buses 34 and 56. Other tables are built ad hoc per transaction. Simplified examples of these tables and their use are presented below.

Figure 2:
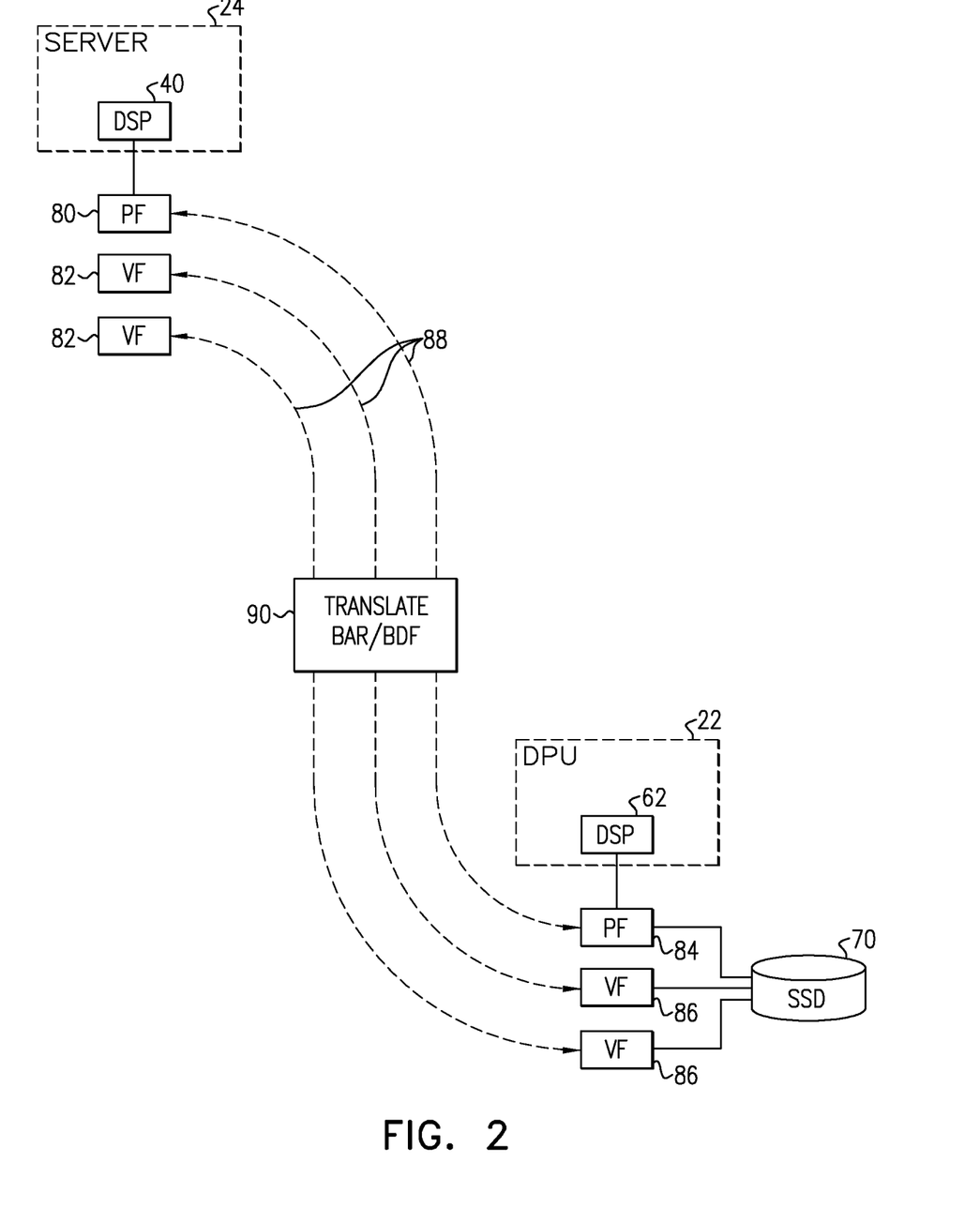
FIGS. 2, 3 and 4 are block diagrams that schematically illustrate methods for interconnection between a host processor and a peripheral device, in accordance with an embodiment of the invention.

FIG. 2 is a block diagram that schematically illustrates a method for interconnection of functions of a peripheral device on bus 56 of DPU 22 to corresponding functions on bus 34 of server 24, in accordance with an embodiment of the invention. In this example, the peripheral device serving as the physical endpoint (EP) on bus 56 is assumed to be SSD 70; but the principles of this and the subsequent examples are similarly applicable to other types of peripheral devices.

In the pictured example, SSD 70 exposes a PF 84 and multiple VFs 86 via DSP 62 on bus 56 of DPU 22. All these functions are exposed fully to server 24, which configures a corresponding PF 80 and VFs 82 on bus 34 via DSP 40. In the course of the enumeration, configuration, and "Device Engage" processes described above, CPU 50 of DPU 22 configures translation tables 90 in switching logic 72 for the respective BARs of PF 80 and VFs 82. (Alternatively, when there is a fixed stride between multiple VFs within a single BAR, as is used in SR-IOV configurations, a single translation table may be used for all these VFs in each direction of communication.) Translation tables 90 enable switching logic 72 to implement tunnels 88 between PFs 80 and 84 and between VFs 82 and 86. Thus, server 24 is able to control and interact with SSD 70 as though the SSD was physically attached to DSP 40.

Figure 3:
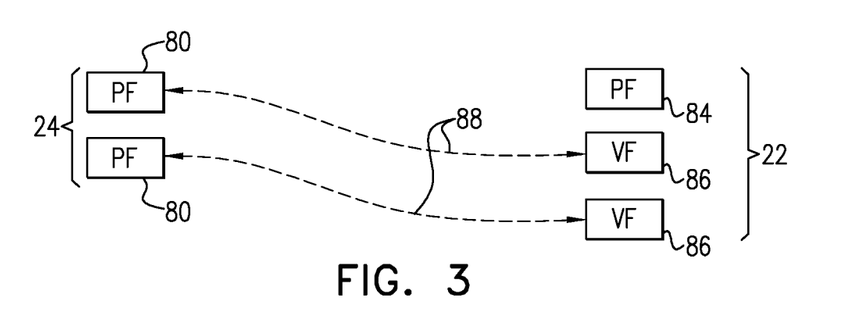

FIG. 3 is a block diagram that schematically illustrates a method for interconnection of functions of a peripheral device on bus 56 of DPU 22 to corresponding functions on bus 34 of server 24, in accordance with another embodiment of the invention. In this case, PF 84 on bus 56 of DPU 22 is not exposed to server 24, so that DSP 22 maintains control of the actual PF 84 of the endpoint. Switching logic 72 exposes VFs 86 as though they were individual PFs of different physical endpoints. Server 24 configures corresponding PFs 80 on bus 34, connected by tunnels 88 to VFs 86.

Figure 4:
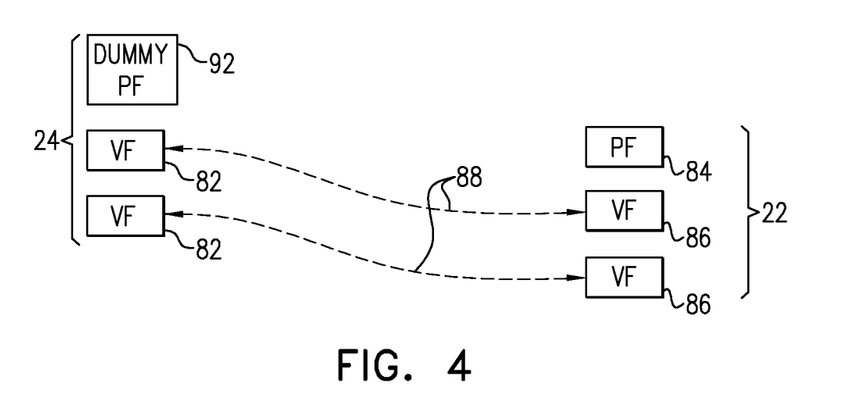

FIG. 4 is a block diagram that schematically illustrates a method for interconnection of functions of a peripheral device on bus 56 of DPU 22 to corresponding functions on bus 34 of server 24, in accordance with yet another embodiment of the invention. In this case, too, PF 84 on bus 56 of DPU 22 is not exposed to server 24, and VFs 86 of the physical endpoint on bus 56 are connected by tunnels 88 to corresponding VFs 82 on bus 34. Since PCIe convention requires that a PF be present on the bus for each connected device, VFs 82 are accompanied by a dummy PF 92, which is not tunneled to any active function on bus 56.

The following tables are simplified examples of translation tables 90 used by switching logic 72 in translating PCIe transaction layer packets (TLPs) received by DPU 22 from host computer 26 for transmission on bus 56 (Table I) and TLPs sent from DPU 22 to host computer 26 for transmission on bus 34 (Table II). The tables are followed by several examples illustrating typical bus transactions carried out through switching logic 72 using the tables. In these examples, the tables are assumed to be used for accessing bus addresses in the BAR 0x100000-0x101000 on bus 34.

TABLE I

ADDRESS TRANSLATION - HOST TO PHYSICAL EP

| Field | Description | Value | Configuration |
|---|---|---|---|
| region_io | Set if the tunnel represents IO BAR, cleared if it | 0 | Communicated by DPU SW during "Engage Device" |

TABLE I-continued

ADDRESS TRANSLATION - HOST TO PHYSICAL EP

| Field | Description | Value | Configuration |
|---|---|---|---|
| region_start_addr[63:12] | represents Memory BAR. Stores the BAR that was assigned by the DPU to the EP. When Host initiates Memory Request to the DPU Peripheral Device, the Address field in TLP will be translated using this field as base. | 0x200000 | command. Communicated by DPU SW during "Engage Device" command. |
| emu_space_reqid[15:0] | Stores the BDF of the root port in DPU domain. When Host initiates Memory Request to the DPU Peripheral Device, the 'RequesterID' field in TLP will be replaced by this field. | 02:00.0 | Known during DPU enumeration. |
| func_bar_log_size[5:0] | Reflects the size of the BAR. | 1 Kb | Communicated by DPU SW during "Engage Device" command. |
| num_of_func[1:0] | Reflects the number of Functions in DPU domain that are engaged to the Host. | 1 | Communicated by DPU SW during "Engage Device" command. |

TABLE II

ADDRESS TRANSLATION - PHYSICAL EP TO HOST

| Field | Description | Value | Configuration |
|---|---|---|---|
| host_pid[2:0] host_lid[2:0] | The USP to which the Host is connected. | Host#1 | Communicated by DPU SW during "Engage Device" command. |
| dest_bdf[15:0] (xlated_bdf) | Holds the BDF of the root port in Host domain. When Physical EP initiates Message-Routed-by-BDF, the 'BDF' field in TLP will be replaced by this field. | 02:00.0 | Known during Host enumeration. |
| emu_requested_id[15:0] (xlated_requester_id) | Holds the BDF of the DPU Peripheral Function in the Host domain. When Physical EP initiates transaction, the 'RequesterID' field in TLP will be replaced by this field. | 01:00.0 | Communicated by DPU SW during "Engage Device" command. |
| num_of_func[15:0] | Reflects the number of Functions in DPU domain that are engaged to the Host. | 1 | Communicated by DPU SW during "Engage Device" command. |

Example I—Host to EP Write

Original TLP on Bus 34
  Type: WRITE
  BAR address: 0x100004
  RequesterID: 11:00.0 (Host #1 CPU)
  Data: 0xDEADBEAF
The BAR address is translated using the base address of the range (0x100000) and the region_start_addr field from Table I. The Requester ID is translated using the BDF provided by the emu_space_reqid field in Table I. The resulting translated TLP is as follows:
Translated TLP on Bus 56
  Type: WRITE
  BAR address: 0x100004−0x100000+ 0x200000=0x200004
  RequesterID: 12:00.0
  Data: 0xDEADBEAF
(In this example, the value "12:00.0" is globally configured as the Requester ID of root complex 54.)

Example II—Host to EP Read

In response to a read request from host computer 26, switching logic 72 creates a temporary context table (shown below as Table III), which it then uses in completing the read transaction by sending data to the host computer.
Original TLP on Bus 34
  Type: READ
  BAR address: 0x100004
  RequesterID: 11:00.0
  Tag=0xA
Translated TLP on Bus 56
  Type: READ
  BAR address: 0x100004−0x100000+ 0x200000=0x200004
  RequesterID: 12:00.0
  Tag=0xB (read from a pool of free tags)

TABLE III

READ CONTEXT TABLE

| Field | Value |
|---|---|
| Original tag | 0xA |
| Original Req ID | 11:00.0 |
| Orig. Completer ID | 01:00.0 |

In response to the translated read TLP, SSD 70 will return a completion TLP over bus 56 with Requester ID 12:00.0 and Tag 0xB. Switching logic 72 uses Tables II and III in generating a translated TLP for transmission over bus 34:
Original TLP on Bus 56
  Type: Completion
  RequesterID: 12:00.0
  CompleterID: 02:00.0
  Tag=0xB
  Data=0xDEADBEAF
Translated TLP on Bus 34
  Type: Completion
  Requester ID: 11:00.0
  CompleterID: 01:00.0
  Tag=0xA
  Data=0xDEADBEAF
After completion of the transaction, the context table is deleted.

Example III—Host to EP Write

Switching logic 72 performs the following translation using the BDF provided by the emu_requested_id field in Table II:
Original TLP on Bus 56
  Type: WRITE
  RequesterID: 02:00.0
  Address=0x80000
Translated TLP on Bus 34
  Type: WRITE
  RequesterID: 01:00.0
  Address=0x80000

Example IV—EP to Host Read

In response to a read request from SSD 70, switching logic 72 creates a temporary context table (shown below as Table IV), which it then uses in completing the read transaction by conveying data from host computer 26 to SSD 70.
Original TLP on Bus 56
  Type: READ
  RequesterID: 02:00.0
  Address: 0x80000
  Tag=0xA
Translated TLP on Bus 34
  Type: READ
  RequesterID: 01:00.0
  Address: 0x80000
  Tag=0xB

TABLE IV

READ CONTEXT TABLE

| Field | Value |
|---|---|
| Original tag | 0xA |
| Original Req ID | 02:00.0 |
| Orig. Completer ID | 12:00.0 |

In response to the translated read TLP, host computer 26 will return a completion TLP over bus 34 with Requester ID 02:00.0 and Tag 0xB. Switching logic 72 uses Tables I and IV in generating a translated TLP for transmission over bus 56:
Original TLP on Bus 34
  Type: Completion
  RequesterID: 01:00.0
  CompleterID: 11:00.0
  Tag=0xB
  Data=0xDEADBEAF
Translated TLP on Bus 56
  Type: Completion
  Requester ID: 02:00.0
  CompleterID: 12:00.0
  Tag=0xA
  Data=0xDEADBEAF
After completion of the transaction, the context table is deleted.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
a central processing unit (CPU);
a root complex connected to the CPU and to a first peripheral component bus, which has a first address space and has at least a first downstream port for connection to at least one peripheral device, wherein the root complex is to present the at least one peripheral device to the CPU in the first address space; and
switching logic, which has an upstream port for connection to a second downstream port on a second peripheral component bus of a host computer, the second peripheral component bus having a second address space, wherein the switching logic is connected to the root complex so that when a peripheral device is connected to the first downstream port on the first peripheral component bus, the switching logic presents the peripheral device to the host computer in the second address space of the second peripheral component bus.

2. The apparatus according to claim 1, wherein the switching logic comprises a virtual switch.

3. The apparatus according to claim 1, wherein the switching logic is to present the peripheral device as a physical function in the address space of the second peripheral component bus.

4. The apparatus according to claim 3, wherein the peripheral device is to expose a virtual function on the first peripheral component bus, and the switching logic is to present the virtual function as the physical function in the address space of the second peripheral component bus.

5. The apparatus according to claim 1, wherein the switching logic is to present the peripheral device as a virtual function in the address space of the second peripheral component bus.

6. The apparatus according to claim 1, wherein the peripheral device comprises a data storage device.

7. The apparatus according to claim 1, wherein the peripheral device comprises a network interface controller (NIC).

8. The apparatus according to claim 1, wherein the switching logic is to receive a bus transaction via the upstream port referencing the second address space of the second peripheral component bus and directed to the peripheral device, to translate the bus command to the first address space, and to transmit the translated bus command over the first peripheral component bus.

9. The apparatus according to claim 1, wherein the switching logic is to reserve a segment of the address space for a dummy device, to enable hot-plugging of a further peripheral device in the reserved segment.

10. A method for computing, comprising:
providing a peripheral device server comprising a central processing unit (CPU) and a root complex connected to a first peripheral component bus having a first address space;
connecting a peripheral device to a first downstream port on the first peripheral component bus, wherein the root complex presents the peripheral device to the CPU in the first address space;
connecting an upstream port of the peripheral device server to a second downstream port on a second peripheral component bus of a host computer, the second peripheral component bus having a second address space; and
using switching logic in the peripheral device server coupled between the upstream port and the first downstream port, presenting the peripheral device to the host computer in the second address space of the second peripheral component bus.

11. The method according to claim 10, wherein the switching logic comprises a virtual switch coupled between the upstream port and the first downstream port.

12. The method according to claim 10, wherein presenting the peripheral device comprises exposing the peripheral device as a physical function in the address space of the second peripheral component bus.

13. The method according to claim 12, wherein coupling the peripheral device comprises exposing a virtual function of the peripheral device on the first peripheral component bus, and wherein exposing the peripheral device comprises presenting the virtual function as the physical function in the address space of the second peripheral component bus.

14. The method according to claim 10, wherein presenting the peripheral device comprises exposing the peripheral device as a virtual function in the address space of the second peripheral component bus.

15. The method according to claim 10, wherein the peripheral device comprises a data storage device.

16. The method according to claim 10, wherein the peripheral device comprises a network interface controller (NIC).

17. The method according to claim 10, and comprising receiving, by the switching logic, a bus transaction via the upstream port referencing the second address space of the second peripheral component bus and directed to the peripheral device, translating the bus command to the first address space, and transmitting the translated bus command over the first peripheral component bus.

18. The method according to claim 10, and comprising reserving a segment of the address space for a dummy device, to enable hot-plugging of a further peripheral device in the reserved segment.

* * * * *